(12) United States Patent
Scanzano et al.

(10) Patent No.: US 9,979,736 B2
(45) Date of Patent: *May 22, 2018

(54) CLOUD-BASED SURVEILLANCE WITH INTELLIGENT TAMPER PROTECTION

(71) Applicant: International Business Machines Corporation, Armonk, NY (US)

(72) Inventors: Francis X. Scanzano, Newburgh, NY (US); Kyle S. Wonderly, Beacon, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/432,159

(22) Filed: Feb. 14, 2017

(65) Prior Publication Data

US 2017/0155663 A1    Jun. 1, 2017

Related U.S. Application Data

(63) Continuation of application No. 14/471,500, filed on Aug. 28, 2014, now Pat. No. 9,614,871.

(51) Int. Cl.
*H04L 29/06* (2006.01)
*H04N 7/18* (2006.01)
(Continued)

(52) U.S. Cl.
CPC .......... *H04L 63/123* (2013.01); *H04N 5/232* (2013.01); *H04N 5/77* (2013.01); *H04N 7/181* (2013.01)

(58) Field of Classification Search
CPC ........ H04L 63/123; H04N 5/232; H04N 5/77; H04N 7/181
(Continued)

(56) References Cited

U.S. PATENT DOCUMENTS 6,131,136 A * 10/2000 Liebenow ........... H04L 12/5692
　　　　　　　　　　　　　　　　　455/553.1
7,721,096 B2 * 5/2010 Chiasson ............ G06F 21/6245
　　　　　　　　　　　　　　　　　713/168
(Continued)

OTHER PUBLICATIONS

Francis X. Scanzano et al., "Cloud-Based Surveillance With Intelligent Tamper Protection", U.S. Appl. No. 14/471,500, filed Aug. 2014.
(Continued)

*Primary Examiner* — Michael S McNally
(74) *Attorney, Agent, or Firm* — Cantor Colburn LLP; Margaret A. McNamara

(57) ABSTRACT

In one embodiment, a security system includes a central communication unit and a first surveillance device. The central communication unit is communicatively connected over a network to cloud storage, by way of a first transmission channel and a second transmission channel. The second transmission channel is redundant with the first transmission channel. The first surveillance device configured to record first surveillance data, and is communicatively connected to the central communication unit by way of a third transmission channel and a fourth transmission channel. The fourth transmission channel is redundant with the third transmission channel. The first surveillance device is configured to transmit the first surveillance data to the central communication unit, and the central communication unit is configured to transmit the first surveillance data to the cloud storage.

18 Claims, 4 Drawing Sheets

(51) Int. Cl.
*H04N 5/232* (2006.01)
*H04N 5/77* (2006.01)

(58) Field of Classification Search
USPC .......................................................... 726/34
See application file for complete search history.

(56) References Cited

U.S. PATENT DOCUMENTS

| | | | | |
|---|---|---|---|---|
| 7,836,204 | B2* | 11/2010 | Kalos | G06F 11/2007 709/239 |
| 7,853,787 | B2* | 12/2010 | Hasegawa | G05B 19/054 713/150 |
| 7,913,297 | B2* | 3/2011 | Wyld | H04L 63/08 726/5 |
| 8,380,126 | B1* | 2/2013 | Ma | A61B 5/7475 455/41.2 |
| 2002/0019223 | A1* | 2/2002 | Lee | G06Q 20/3674 455/411 |
| 2002/0065076 | A1* | 5/2002 | Monroe | H04W 88/06 455/552.1 |
| 2007/0204332 | A1* | 8/2007 | Pan | G06F 21/71 726/5 |
| 2007/0271454 | A1* | 11/2007 | Yen | G08B 13/19656 713/153 |
| 2007/0283005 | A1* | 12/2007 | Beliles | H04L 41/0816 709/224 |
| 2012/0050040 | A1* | 3/2012 | Melvin, Jr. | G08B 13/08 340/545.6 |
| 2015/0052578 | A1* | 2/2015 | Yau | H04W 12/00 726/3 |
| 2015/0078162 | A1* | 3/2015 | Prakash | H04W 28/10 370/235 |
| 2015/0110130 | A1* | 4/2015 | Vedantham | H04L 45/70 370/437 |

OTHER PUBLICATIONS

Francis X. Scanzano et al., "Cloud-Based Surveillance With Intelligent Tamper Protection", U.S. Appl. No. 14/844,052, filed Sep. 3, 2015.
List of IBM Patents or Patent Applications Treated as Related; (Appendix P), Filed Feb. 14, 2017); 2 pages.

* cited by examiner

CLOUD-BASED SURVEILLANCE WITH INTELLIGENT TAMPER PROTECTION

DOMESTIC PRIORITY

This application is a continuation of and claims priority from U.S. patent application Ser. No. 14/471,500, filed Aug. 28, 2014. The contents of which are incorporated by reference herein in their entirety.

BACKGROUND

The present invention related generally to security systems, and more specifically, to cloud-based surveillance with intelligent tamper protection.

To save video footage, current home surveillance systems use local storage, such as digital video recorders (DVRs) or network attached storage on a home network. This puts the video data at high risk for various reasons. For instance, if the local storage fails, all surveillance data may be lost, or recording may not take place at all. Further, if a potential intruder knows the location of the storage, that intruder may be able to destroy the surveillance data. This possibility might create increased confidence for that intruder and, as a result, increased likelihood of intrusion.

SUMMARY

In one embodiment of this disclosure, a system includes a central communication unit and a first surveillance device. The central communication unit is communicatively connected over a network to cloud storage in a remote location from the central communication unit. The communicative connection is by way of a first transmission channel and a second transmission channel, where the second transmission channel is redundant with the first transmission channel. The second transmission channel may further be independent of the first transmission channel. The first surveillance device is configured to record first surveillance data on the premises of the central communication unit, and is communicatively connected to the central communication unit by way of a third transmission channel and a fourth transmission channel. The fourth transmission channel is redundant with the third transmission channel. The fourth transmission channel may further be independent of the third transmission channel. The first surveillance device is configured to transmit the first surveillance data to the central communication unit, and the central communication unit is configured to transmit the first surveillance data to the cloud storage.

In another embodiment, a computer implemented method for managing a security system includes receiving, at a central communication unit from a first surveillance device, a recording of first surveillance data captured by the first surveillance device. The first surveillance data is received by way of at least one of a first transmission channel and a second transmission channel between the first surveillance device and the central communication unit. The second transmission channel is redundant with the first transmission channel. The second transmission channel may further be independent of the first transmission channel. The first surveillance data is transmitted, from the central communication unit to cloud storage, where the first surveillance data is transmitted by way of at least one of a third transmission channel and a fourth transmission channel between the first surveillance device and the central communication unit. The fourth transmission channel is redundant with the third transmission channel. The fourth transmission channel may further be independent of the third transmission channel.

In yet another embodiment, a computer program product for implementing a security system includes a computer readable storage medium having program instructions embodied therewith, where the computer readable storage medium is not a signal. The program instructions are executable by a processing circuit to cause the processing circuit to perform a method. The method includes receiving, at a central communication unit from a first surveillance device, a recording of first surveillance data captured by the first surveillance device. The first surveillance data is received by way of at least one of a first transmission channel and a second transmission channel between the first surveillance device and the central communication unit. The second transmission channel is redundant with the first transmission channel. The second transmission channel may further be independent of the first transmission channel. Further according to the method, the first surveillance data is transmitted, from the central communication unit to cloud storage, where the first surveillance data is transmitted by way of at least one of a third transmission channel and a fourth transmission channel between the first surveillance device and the central communication unit. The fourth transmission channel is redundant with the third transmission channel. The fourth transmission channel may further be independent of the third transmission channel.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to this disclosure, a security system may manage surveillance data using one or multiple forms of redundancy, thus providing reduced fallibility as compared to conventional security systems. To this end, the security system may leverage cloud storage to provide an extra layer of protection and stability to home or business monitoring. Some embodiments of the security system may have multiple storage locations, multiple power sources, and multiple transmission channels. Additionally, the security system may be enabled to alert authorities if an invasion occurs, or in the case of certain failures or issues with the security system. As a result, intruders may find severe difficulty in avoiding detection.

Figure 1:
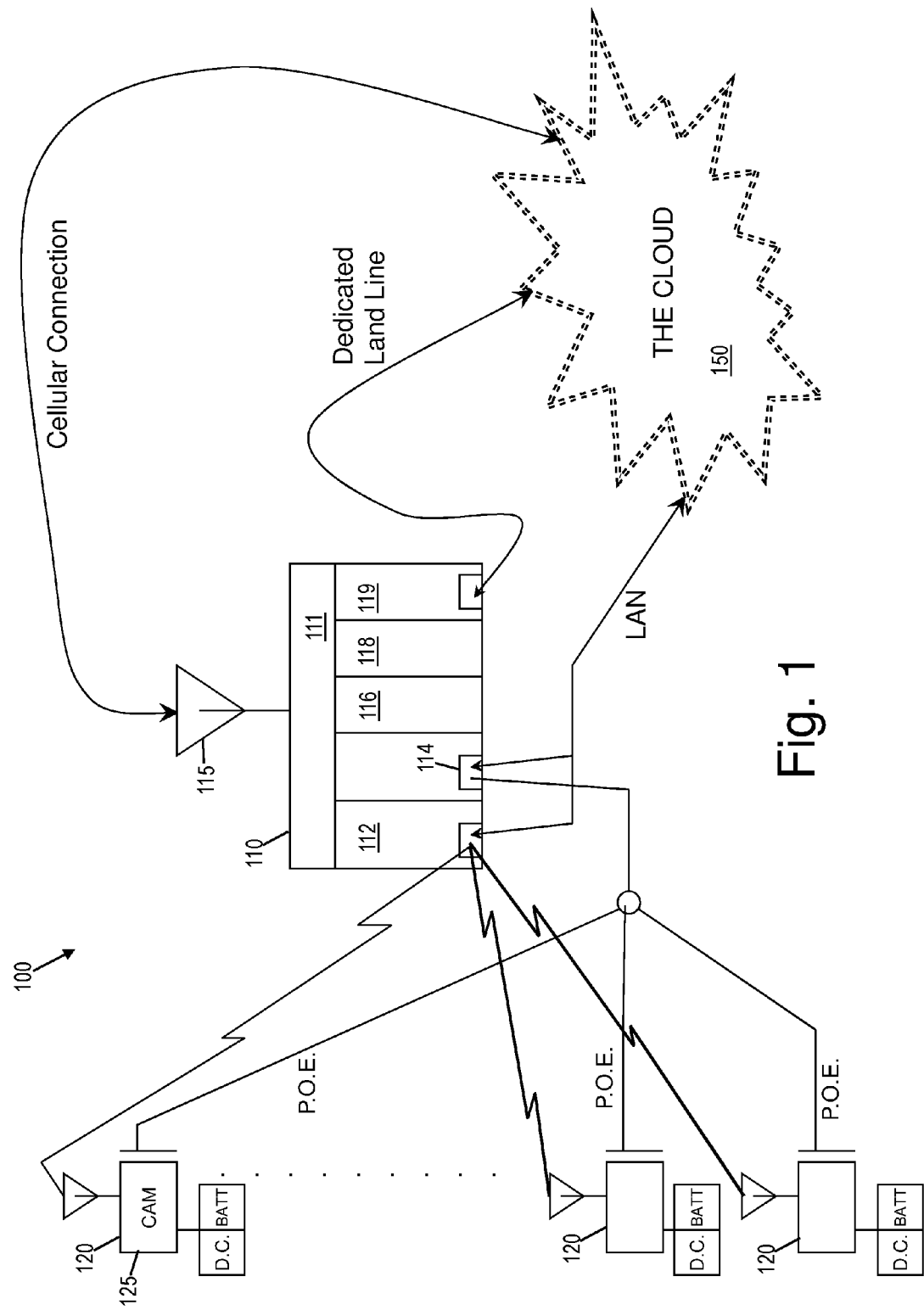
FIG. 1 depicts a block diagram of a security system, in accordance with an embodiment.

FIG. 1 is a block diagram of a security system 100, according to some embodiments of this disclosure. As shown, the security system 100 may include a central communication unit 110 and one or more surveillance devices 120, such as cameras 125 or microphones.

The surveillance devices 120, or recording devices, may be configured to record activity on the premises of the security system 100. In some embodiments, these recordings may occur continuously. In other embodiments, however, a surveillance device 120 may include sound or motion detection technology, and may record only after sound or motion is detected. Each surveillance device 120 may capture surveillance data when recording.

Each surveillance device 120 may be directly or indirectly connected to a combination of one or more batteries, alternating current (AC) power supply, direct current (DC) power supply, a power over Ethernet (POE) line, or other form of power source. As a result of this redundancy in power sources, the surveillance device 120 may continue operating even if one or more of the power sources fail.

The central communication unit 110 may be in communication with cloud storage 150, and may also manage the surveillance devices 120. The central communication unit 110 may include, for example, local storage 111, a wireless router 112, one or more Ethernet ports 114, a cellular device 115, a battery 116, a modem 118, and a buffering unit 119. In some embodiments, various other components may be included in the central communication unit 110, such as components providing additional communication or power mechanisms. The buffering unit 119 may be made up of hardware, software, or a combination thereof. Further details of the buffering unit 119 follow later in this disclosure.

The central communication unit 110 may provide local storage 111 for surveillance data captured by the surveillance devices 120. When surveillance data, such as audio or video, is captured by a surveillance device 120, the surveillance device 120 may transmit this surveillance data to the central communication unit 110 for storage. Thus, the central communication unit 110 may be in communication with the surveillance devices 120.

In some embodiments, multiple transmission channels may be used between each camera and the central communication unit 110. For example, and not by way of limitation, each surveillance device 120 may be connected to the central communication unit 110 by one or more of the following: wired local area network (LAN), such as by use of Ethernet connected to an Ethernet port 114; wireless LAN, through connection to the wireless router 112; cellular connection, through the cellular device 115; Bluetooth; or other mechanisms. The surveillance device 120 may transmit data to the central communication unit 110 periodically, continuously during capture, or according to various other schedules.

As mentioned above, the central communication unit 110 may also be connected to cloud storage 150, which may include various types of storage in one or more remote locations. The connection to cloud storage 150 may occur by way of various transmission channels over one or more networks. For example, the central communication unit 110 may be connected to cloud storage 150 by one or more of the following: wired LAN, such as by use of an Ethernet port 114; wireless LAN, such as by use of the wireless router 112; dedicated landline, which may be connected to the modem 118; or by use of the cellular device 115.

The central communication unit 110 may transmit, or back up, surveillance data to cloud storage 150 according to a schedule, which may be customizable by a user in some embodiments. For instance, in some embodiments, the surveillance data may be continuously transmitted, beginning as soon as the surveillance data is received at the central communication unit 110 from one or more surveillance devices 120. In some other embodiments, the surveillance data may be transmitted periodically. After transmission, surveillance data may remain in local storage 111 on the central communication unit 110 or, in some embodiments, it may be deleted. In the latter case, deletion may occur on a schedule. For example, surveillance data older than a predetermined age may be deleted from local storage 111, while newer surveillance data is maintained. The predetermined age, if used, may be user-customizable.

In some embodiments, where the security system 100 includes more than a single surveillance device 120, the central communication unit 110 may make decisions regarding the order in which surveillance data from the various surveillance devices 120 is uploaded to cloud storage 150. These decisions may also affect the order in which surveillance data is buffered by the buffering unit 119, because surveillance data may be buffered prior to being transmitted to cloud storage 150. In some embodiments, for example, the central communication unit 110 may transmit the surveillance data in a round robin fashion, addressing each surveillance device 120 in turn by buffering and then transmitting its corresponding surveillance data, or at least a portion of its surveillance data.

The buffering unit 119 of the central communication unit 110 may buffer the surveillance data prior to transmission to cloud storage 150. In other words, the buffering unit 119 may prepare the surveillance data for transmission. Such preparations may take various forms, and in some embodiments, the buffering unit 119 may determine which preparations to perform based on the current state of the security system 100. This determination may be based on various factors related to the state of the security system 100, such as, for example, the current power sources or data transmission channels being used. In some embodiments, the conditions under which a particular preparation is performed on the surveillance data may be a set of user-customizable conditions.

For example, and not by way of limitation, the buffering unit 119 may be capable of reducing the file size of the surveillance data. This reduction may occur through various mechanisms, such as by reducing the resolution of video, removing frames from video, or encoding audio. Such a reduction may reduce the time required to transmit the surveillance data to cloud storage 150. In some embodiments, for instance, the buffering unit 119 may opt to make such a reduction when the currently active transmission channels to cloud storage 150 are relatively slow, such as a 3G cellular connection. In that case, the smaller data size may reduce the possibility that the security system 100 may experience a failure before the transmission is complete, and may allow the transmission to keep closer pace with the recording of surveillance data. For another example, if the security system 100 is currently experiencing one or more failures, such as a power source being disconnected, the file size may be reduced to decrease transmission time, on the assumption that an attack currently in progress may be to blame for the failure.

In some embodiments, the central communication unit 110 may be enabled to alert external authorities, such as the local police, under predetermined conditions, which conditions may be user-customizable. To this end, the central communication 110 may use one or more of its available transmission channels, such as landline, cellular, or LAN, to contact such authorities. The predetermined conditions under which the central communication unit 110 contacts authorities may vary based on implementation or user-customization. For example, and not by way of limitation, if the central communication unit 110 determines that at least two of its attached power sources and communication mechanisms have failed, the central communication unit 110 may contact the authorities, based on the assumption that an attack may be underway. For another example, if a user enters a false password a predetermined number of times in an attempt to disarm the security system 100, the central communication unit 110 may alert the authorities.

Figure 2:
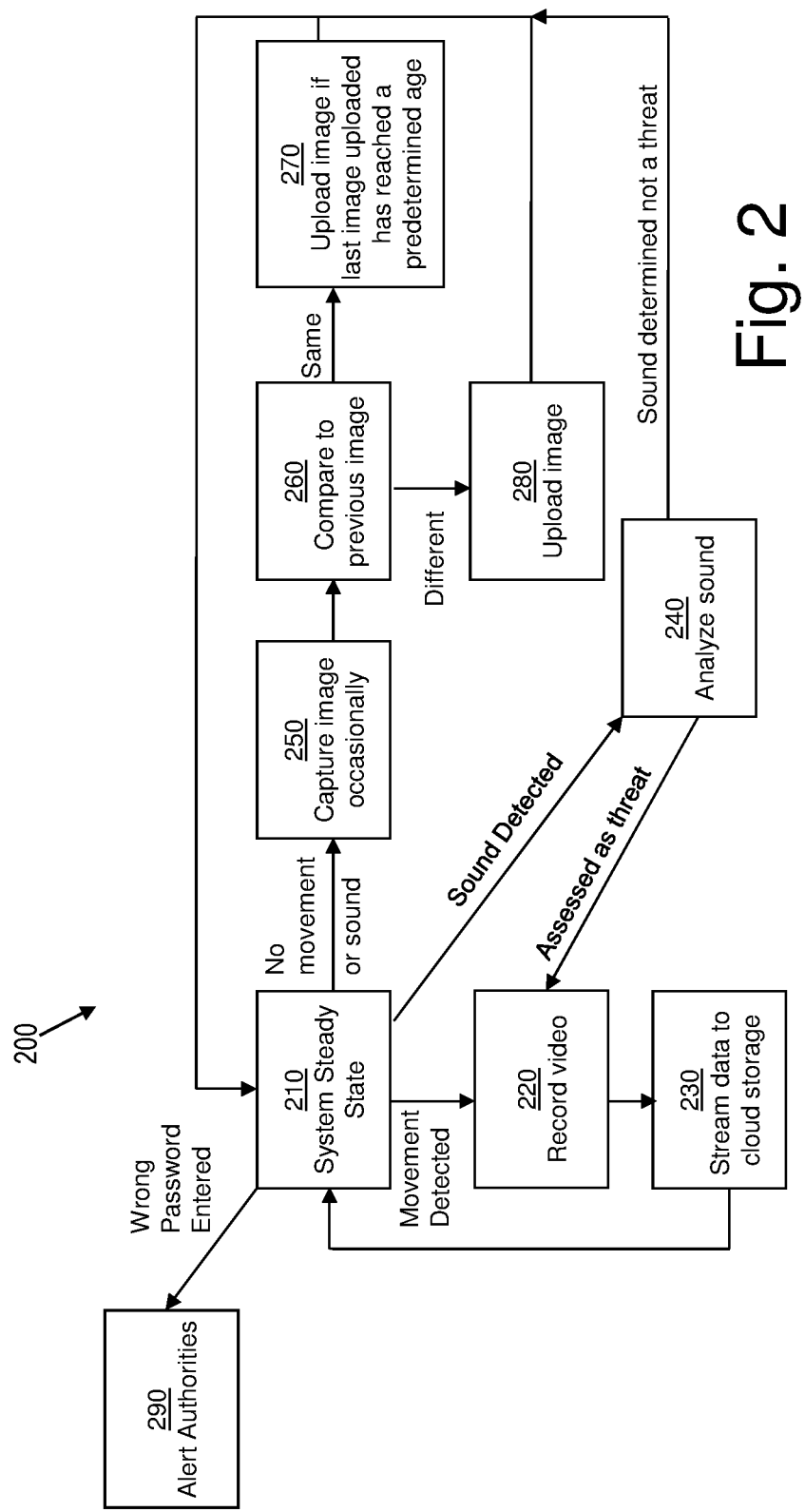
FIG. 2 depicts a flow diagram of a method for capturing surveillance data, in accordance with an embodiment.

FIG. 2 is a flow diagram of a method 200 of capturing surveillance data, according to some embodiments of this disclosure. As shown, at block 210, the security system 100 may maintain a steady state, during which the security system 100 and its various surveillance devices 120 may monitor the premises for sound, movement, or both. At block 220, when movement is detected by a camera surveillance device 120, that surveillance device 120 may begin recording video. The threshold for detection of movement, versus no movement, may be based on conventional mechanisms. During or after recording, at block 230, the recorded surveillance data may be streamed from the central communication unit 110 to cloud storage 150. When the surveillance device 120 detects no further movement, it may stop recording and go back to monitoring for movement, at block 210.

At block 240, if sound is detected by a surveillance device 120, the security system 100 may analyze that sound. The analysis may be performed, for example, by the surveillance device 120 or by the central communication unit 110. If the analyzed sound is assessed as a possible threat, then at block 220, the surveillance device 120 may begin recording. If the analyzed sound is deemed not to be a threat, however, then the surveillance device 120 may go back to monitoring for movement and sound in the steady state of block 210.

At block 250, if no movement or sound is detected by a surveillance device 120 in the steady state of block 210, the surveillance device 120 may occasionally capture images. The frequency with which images are captured may vary based on implementation or user-customization. For example, and not by way of limitation, images may be captured periodically at predetermined intervals. After a current image is captured, at block 260, the current image may be compared to a previous image from the same surveillance device 120. If the current image is deemed to be the same as, or sufficiently similar to, the previous image captured during lack of detected movement, then the current image may be uploaded to cloud storage 150 only if the last uploaded image has reached a predetermined age, at block 270. On the other hand, if the current image differs from the previous one, then the current image may be uploaded to cloud storage 150, at block 280. The surveillance device 120 may then return to monitoring for movement and sound, at block 210. The determination of whether the previous and current images differ may be based on conventional techniques for comparing images. For example, and not by way of limitation, the security system 100 may define images to be the sufficiently similar if a predetermined percentage of pixels in the current image are within a predetermined color range of their corresponding pixels in the previous image.

At block 290, a user may attempt to disarm the security system by entering a password or other credentials. If the user enters the credentials incorrectly a predetermined number of times, which number may be user-customizable, the security system 100 may automatically alert the authorities, sound an alarm, or initiate another alert mechanism.

In some embodiments, the detection of sound and movement of method 200 may be made separately for each surveillance device 120. In other words, for example, one surveillance device 120 may be recording after having detected movement, at block 220, while another is capturing occasional images in response to having detected no movement or sound, at block 250. Further, it will be understood that other methods for capturing surveillance data are also within the scope of this disclosure. For example, although the above description of method 200 refers to use of motion detection and video recording, an analogous method comprising audio detection only and microphones incapable of video recording and motion detection is also within the scope of this disclosure.

Figure 3:
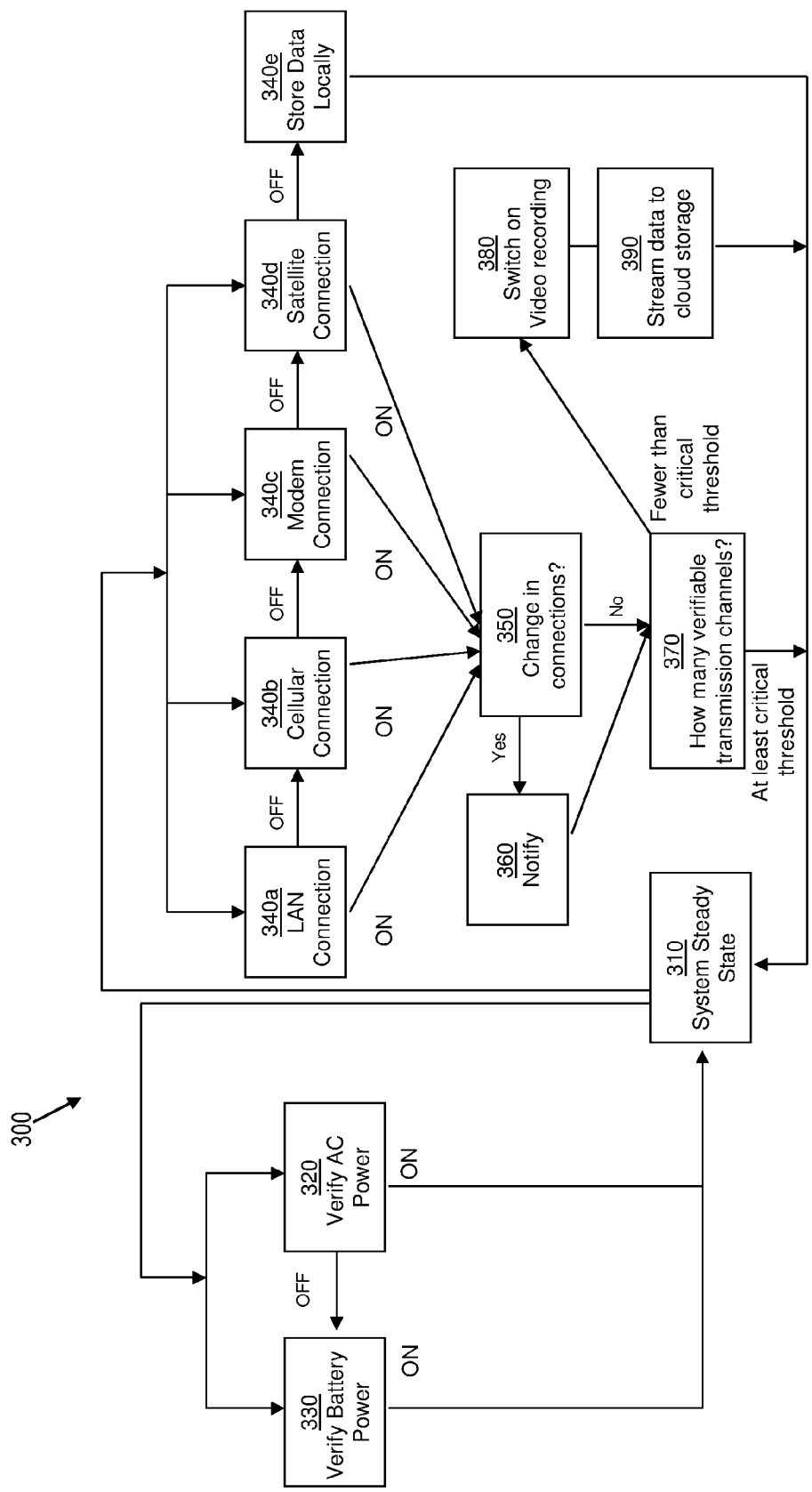
FIG. 3 depicts a flow diagram of a method for providing power and data communication channels to the security system, in accordance with an embodiment.

FIG. 3 is a flow diagram of a method 300 for providing power and data transmission channels to the central communication unit 110 of the security system 100, according to some embodiments of this disclosure. As discussed above, the security system 100 may be connected to multiple power sources and transmission channels. In some instances, one or more power sources or transmission channels may fail, becoming unusable to the security system 100. Failure may include, for example, becoming disconnected from the security system 100 or otherwise not providing power (i.e., in the case of a power source) or a data transmission capability (i.e., in the case of a transmission channel). In general, as shown, the security system 100 may verify power sources and transmission channels in a round robin fashion, using the highest priority (i.e., deemed to be the best) power sources and transmission channels that are verifiable as useable.

As shown at block 310, the central communication unit 110 may have a steady state, during which it monitors its power sources, transmission channels, or both. At block 320, the central communication unit 110 may verify that it is currently receiving AC power, or DC power in some embodiments. If AC power is being received, then no change need be made with respect to the power sources of the central communication unit 110, which may continue monitoring for changes. If, however, AC power (or DC power, in some embodiments) is not being received, the central communication unit 110 may switch to battery power, at block 330.

At the steady state, the central communication unit 110 may also monitor its transmission channels. The central communication unit 110 may verify that a LAN connection is live, at block 340a. If a LAN connection is not live, the central communication unit 110 may switch to transmission over its cellular connection, at block 340b. If the cellular connection cannot be verified as live, the central communication unit 110 may switch to transmission by use of its modem connection, at block 340c. If the modem connection cannot be verified as live, the central communication unit 110 may switch over to its satellite connection, at block 340d. If the satellite connection cannot be verified, the central communication unit 110 may store data locally in its local storage device 111, at block 340e, instead of transmitting the surveillance data to cloud storage 150. In this example, as shown, the transmission channels are prioritized in the following order: LAN, cellular, modem, satellite, and then local storage (i.e., no transmission). It will be understood that other prioritizations may be made in some embodiments. In general, the prioritization may be based on transmission speed, with the highest priority going to the transmission channel with the fastest expected speed. Alternatively, in some embodiments, prioritization may be based on reliability instead, or some combination of speed, reliability, and possibly other factors. The central communication unit 110 may monitor its transmission channels in a round robin fashion and use the one with the highest priority among those that can be verified as currently useable. Analogously, as shown, the central communication unit 110 may prioritize the power sources and use the verifiable one with the highest priority.

Analogously to method 300, each surveillance device 120 may prioritize its power sources as well as its transmission channels to the central communication unit 110. In some embodiments, the surveillance device 120 may then use the verifiable power source with highest priority, as well as the verifiable transmission channel with highest priority.

Referring to FIG. 3 again, if a connection change is made with respect to the transmission channels, at decision block 350, then a user may be notified of such change at block 360. In this way, the user may remain informed about the state of the security system 100. In some embodiments, the user may also be informed when changes are made with respect to which power source is being used. At block 370, the central communication unit 110 may determine how many of its transmission channels are verifiable, i.e., useable. The security system 100 may use a critical threshold number of transmission channels, such that a number lower than that may be deemed to be an issue, which may be indicative of an ongoing attack. If, at block 370, it is determined that the current number of verifiable transmission channels is less than that critical threshold, then at block 380, video recording and upload may begin. At block 390, the recorded surveillance data from such video recording may be streamed to cloud storage 150.

Figure 4:
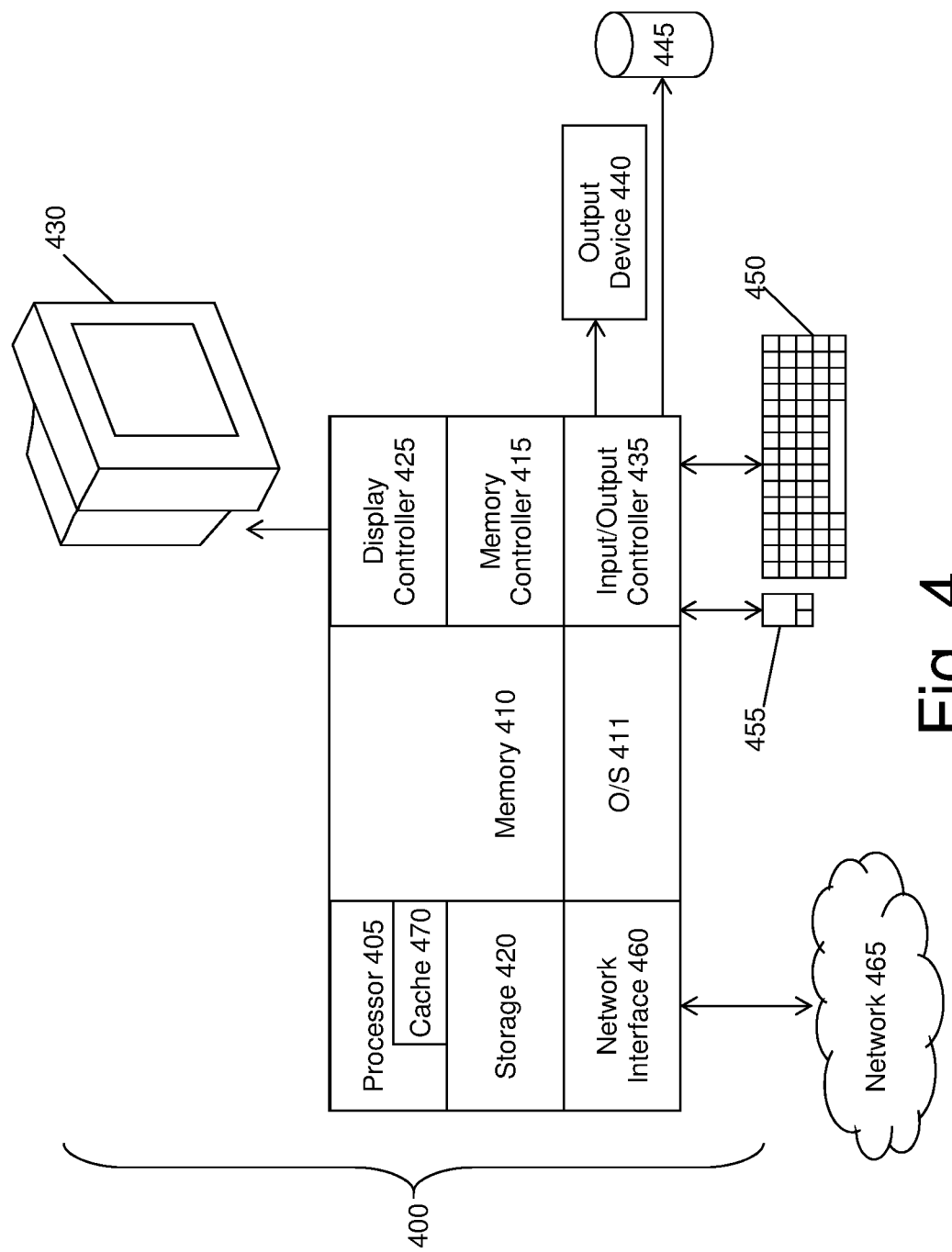
FIG. 4 depicts a block diagram of a computing device for implementing some or all aspects of the security system, in accordance with an embodiment.

FIG. 4 illustrates a block diagram of a computer system 400 for use in implementing a security system or method according to some embodiments. For example, in some embodiments, some aspects of the methods of FIGS. 2 and 3 may be implemented in such a computer system 400. The security systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 400, such as a personal computer, workstation, minicomputer, or mainframe computer.

In an exemplary embodiment, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. A conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be any custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the security systems and methods of this disclosure.

The computer system 400 may further include a display controller 425 coupled to a display 430. In an exemplary embodiment, the computer system 400 may further include a network interface 460 for coupling to a network 465. The network 465 may be an IP-based network for communication between the computer system 400 and any external server, client and the like via a broadband connection. The network 465 transmits and receives data between the computer system 400 and external systems. In an exemplary embodiment, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Security systems and methods according to this disclosure may be embodied, in whole or in part, in computer program products or in computer systems 100, such as that illustrated in FIG. 4.

Technical effects and benefits include intelligent detection of, and reaction to, tampering in a security system 100. Due to the redundancy provided through multiple power sources and multiple data transmission mechanisms, embodiments of the security system 100 may drastically reduce the chances of lost or missing surveillance data, as compared to conventional security systems. In some embodiments, the security system 100 may be autonomous, selecting which power sources and transmission channels to use based on provided settings, thus ensuring the security system 100 stays up and running.

In one embodiment, a security system includes a central communication unit and a first surveillance device, connected to each other by way of a first transmission channel and a second transmission channel. The surveillance device is configured to record first surveillance data and to transmit that first surveillance data to the central communication unit, which is configured to transmit the first surveillance data to cloud storage.

In addition to one or more of the features described above, or as an alternative, the central communication unit may be configured to use the first transmission channel to transmit the first surveillance data to the cloud storage if the first transmission channel is verifiable as useable, and to use the second transmission channel to transmit the first surveillance data to the cloud storage if the first transmission channel is not verifiable as useable In addition to one or more of the features described above, or as an alternative, the central communication unit may be enabled to transmit the first surveillance data to the cloud storage by way of a plurality of transmission channels, including the first transmission channel and the second transmission channel. The central communication unit may select, for transmitting the first surveillance data to the cloud storage, a verifiable transmission channel with highest priority from among the plurality of transmission channels.

In addition to one or more of the features described above, or as an alternative, the first surveillance device may be configured to begin recording the first surveillance data based on a determination that fewer than a critical threshold number of the plurality of transmission channels are verifiable.

In addition to one or more of the features described above, or as an alternative, the central communication unit may further include a first power source and a second power source, where the second power source is redundant with the first power source. The second power source may further be independent of the first power source.

In addition to one or more of the features described above, or as an alternative, the first surveillance device may be configured to use a third transmission channel to transmit the first surveillance data to the central communication unit if the third transmission channel is verifiable as useable. The first surveillance device may be further configured to use a fourth transmission channel to transmit the first surveillance data to the central communication unit if the third transmission channel is not verifiable as useable.

In addition to one or more of the features described above, or as an alternative, the central communication unit may further include a buffering unit configured to perform preparations on the first surveillance data prior to the central communication unit transmitting the first surveillance data to the cloud storage. The preparations performed by the buffering unit are dependent on a current state of the security system.

In addition to one or more of the features described above, or as an alternative, the preparations performed by the buffering unit may be dependent on whether the first transmission channel is currently being used to transmit the first surveillance data from the central communication unit to the cloud storage.

In addition to one or more of the features described above, or as an alternative, the central communication unit may further include a first power source and a second power source, where the second power source is redundant with the first power source. In that case, the preparations performed by the buffering unit may be dependent on whether the first power source is currently being used. The second power source may further be independent of the first power source.

In addition to one or more of the features described above, or as an alternative, a second surveillance device is configured to record second surveillance data on the premises of the central communication unit. The second surveillance device may be communicatively connected to the central communication unit. The second surveillance device is configured to transmit the second surveillance data to the central communication unit, where the central communication unit is further configured to transmit the second surveillance data to the cloud storage. The central communication unit may be further configured to select an order in which to transmit the first surveillance data and the second surveillance data to the cloud storage, and where the selected order is based on a round robin technique.

In another embodiment, a computer implemented method for managing a security system includes receiving first surveillance data at a central communication unit, from a first surveillance device. The first surveillance data may be received at the central communication unit by way of a first transmission channel or a second transmission channel. The central communication unit may be configured to transmit the first surveillance data to cloud storage, by way of a third transmission channel or a fourth transmission channel.

In addition to one or more of the features described above, or as an alternative, the central communication unit may be configured to use the third transmission channel to transmit the first surveillance data to the cloud storage if the third transmission channel is verifiable as useable, and to use the fourth transmission channel to transmit the first surveillance data to the cloud storage if the third transmission channel is not verifiable as useable.

In addition to one or more of the features described above, or as an alternative, the central communication unit may be enabled to transmit the first surveillance data to the cloud storage by way of a plurality of transmission channels, including the third transmission channel and the fourth transmission channel. The central communication unit may select, for transmitting the first surveillance data to the cloud storage, a verifiable transmission channel with highest priority from among the plurality of transmission channels.

In addition to one or more of the features described above, or as an alternative, the first surveillance device may be configured to begin recording the first surveillance data based on a determination that fewer than a critical threshold number of the plurality of transmission channels are verifiable.

In addition to one or more of the features described above, or as an alternative, the first surveillance device may be configured to use the first transmission channel to transmit the first surveillance data to the central communication unit if the first transmission channel is verifiable as useable, and to use the second transmission channel to transmit the first surveillance data to the central communication unit if the first transmission channel is not verifiable as useable.

In addition to one or more of the features described above, or as an alternative, the method may perform buffering preparations on the first surveillance data prior to the central communication unit transmitting the first surveillance data to the cloud storage. The buffering preparations performed may be dependent on a current state of the security system.

In addition to one or more of the features described above, or as an alternative, the buffering preparations performed may be dependent on whether the third transmission channel is currently being used to transmit the first surveillance data from the central communication unit to the cloud storage.

In addition to one or more of the features described above, or as an alternative, the central communication unit may include a first power source and a second power source. The second power source is redundant with the first power source. In that case, the buffering preparations performed may be dependent on whether the first power source is currently being used. The second power source may further be independent of the first power source.

In yet another embodiment, a computer program product for implementing a security system includes a computer readable storage medium that is not a signal. The computer readable storage medium includes program instructions for a processing circuit to perform a method. The method includes receiving first surveillance data at a central communication unit, from a first surveillance device. The first surveillance data may be received at the central communication unit by way of a first transmission channel or a second transmission channel. The central communication unit may be configured to transmit the first surveillance data to cloud storage, by way of a third transmission channel or a fourth transmission channel.

In addition to one or more of the features described above, or as an alternative, the central communication unit may be enabled to transmit the first surveillance data to the cloud storage by way of a plurality of transmission channels, including the third transmission channel and the fourth transmission channel. The central communication unit may be configured to select, for transmitting the first surveillance data to the cloud storage, a verifiable transmission channel with highest priority from among the plurality of transmission channels. The first surveillance device may be configured to begin recording the first surveillance data based on a determination that fewer than a critical threshold number of the plurality of transmission channels are verifiable.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A security system comprising:
a central communication unit communicatively connected over a network to a cloud storage in a remote location from the central communication unit, wherein the communicative connection is by way of a first transmission channel and a second transmission channel, wherein the second transmission channel is redundant with the first transmission channel; and
a first surveillance device configured to record first surveillance data on the premises of the central communication unit, and being communicatively connected to the central communication unit by way of a third transmission channel and a fourth transmission channel, wherein the fourth transmission channel is redundant with the third transmission channel;
wherein the first surveillance device is configured to transmit the first surveillance data to the central communication unit, and wherein the central communication unit is configured to transmit the first surveillance data to the cloud storage;
wherein the central communication unit further comprises a buffering unit configured to perform preparations on the first surveillance data prior to the central communication unit transmitting the first surveillance data to the cloud storage; and
wherein the preparations performed by the buffering unit are dependent on a current state of the security system.

2. The security system of claim 1, wherein the central communication unit is configured to use the first transmission channel to transmit the first surveillance data to the cloud storage if the first transmission channel is verifiable as useable, and wherein the central communication unit is configured to use the second transmission channel to transmit the first surveillance data to the cloud storage if the first transmission channel is not verifiable as useable.

3. The security system of claim 1, wherein the central communication unit is enabled to transmit the first surveillance data to the cloud storage by way of a plurality of transmission channels, including the first transmission channel and the second transmission channel, and wherein the central communication unit is configured to select, for transmitting the first surveillance data to the cloud storage, a verifiable transmission channel with highest priority from among the plurality of transmission channels.

4. The security system of claim 3, wherein the first surveillance device is configured to begin recording the first surveillance data based on a determination that fewer than a critical threshold number of the plurality of transmission channels are verifiable.

5. The security system of claim 1, wherein the central communication unit further comprises a first power source and a second power source, wherein the second power source is redundant with the first power source.

6. The security system of claim 1, wherein the first surveillance device is configured to use the third transmission channel to transmit the first surveillance data to the central communication unit if the third transmission channel is verifiable as useable, and wherein the first surveillance device is configured to use the fourth transmission channel to transmit the first surveillance data to the central communication unit if the third transmission channel is not verifiable as useable.

7. The security system of claim 1, wherein the preparations performed by the buffering unit are dependent on whether the first transmission channel is currently being used to transmit the first surveillance data from the central communication unit to the cloud storage.

8. The security system of claim 1, wherein the central communication unit further comprises a first power source and a second power source, wherein the second power source is redundant with the first power source, and wherein the preparations performed by the buffering unit are dependent on whether the first power source is currently being used.

9. The security system of claim 1, further comprising:
a second surveillance device configured to record second surveillance data on the premises of the central communication unit, and being communicatively connected to the central communication unit;
wherein the second surveillance device is configured to transmit the second surveillance data to the central communication unit, and wherein the central communication unit is further configured to transmit the second surveillance data to the cloud storage; and
wherein the central communication unit is further configured to select an order in which to transmit the first surveillance data and the second surveillance data to the cloud storage, and wherein the selected order is based on a round robin technique.

10. A computer program product for implementing a security system, the computer program product comprising a computer readable storage medium having program instructions embodied therewith, wherein the computer readable storage medium is not a signal, the program instructions readable by a processing circuit to cause the processing circuit to perform a method comprising:
receiving, at a central communication unit from a first surveillance device, a recording of first surveillance data captured by the first surveillance device, wherein the first surveillance data is received by way of at least one of a first transmission channel and a second transmission channel between the first surveillance device and the central communication unit, wherein the second transmission channel is redundant with the first transmission channel;
transmitting the first surveillance data, from the central communication unit to a cloud storage, wherein the first surveillance data is transmitted by way of at least one of a third transmission channel and a fourth transmission channel between the first surveillance device and the central communication unit, wherein the fourth transmission channel is redundant with the third transmission channel;
performing buffering preparations on the first surveillance data prior to the central communication unit transmitting the first surveillance data to the cloud storage, wherein the buffering preparations performed are dependent on a current state of the security system.

11. The computer program product of claim 10, wherein the central communication unit is configured to use the first transmission channel to transmit the first surveillance data to the cloud storage if the first transmission channel is verifiable as useable, and wherein the central communication unit uses the second transmission channel to transmit the first surveillance data to the cloud storage if the first transmission channel is not verifiable as useable.

12. The computer program product of claim 10, wherein the central communication unit is enabled to transmit the first surveillance data to the cloud storage by way of a plurality of transmission channels, including the first transmission channel and the second transmission channel, and wherein the central communication unit is configured to select, for transmitting the first surveillance data to the cloud storage, a verifiable transmission channel with highest priority from among the plurality of transmission channels.

13. The computer program product of claim 12, wherein the first surveillance device is configured to begin recording the first surveillance data based on a determination that fewer than a critical threshold number of the plurality of transmission channels are verifiable.

14. The computer program product of claim 10, wherein the central communication unit further comprises a first power source and a second power source, wherein the second power source is redundant with the first power source.

15. The computer program product of claim 10, wherein the first surveillance device is configured to use the first transmission channel to transmit the first surveillance data to the central communication unit if the first transmission channel is verifiable as useable, and wherein the first surveillance device is configured to use the second transmission channel to transmit the first surveillance data to the central communication unit if the first transmission channel is not verifiable as useable.

16. The computer program product of claim 10, wherein the buffering preparations performed are dependent on whether the first transmission channel is currently being used to transmit the first surveillance data from the central communication unit to the cloud storage.

17. The computer program product of claim 10, wherein the central communication unit comprises a first power source and a second power source, wherein the second power source is redundant with the first power source, and wherein the buffering preparations performed are dependent on whether the first power source is currently being used.

18. The computer program product of claim 10, wherein:
a second surveillance device is configured to record second surveillance data on the premises of the central communication unit, and is communicatively connected to the central communication unit;
the second surveillance device is configured to transmit the second surveillance data to the central communication unit; and
the method further comprising:
transmitting the second surveillance data from the central communication unit to the cloud storage; and
selecting, by the central communication unit, an order in which to transmit the first surveillance data and the second surveillance data to the cloud storage, wherein the selected order is based on a round robin technique.

* * * * *